(12) United States Patent
Aboul-Magd et al.

(10) Patent No.: US 11,109,395 B2
(45) Date of Patent: Aug. 31, 2021

(54) DATA TRANSMISSION PREEMPTION

(71) Applicant: HUAWEI TECHNOLOGIES CO., LTD., Guangdong (CN)

(72) Inventors: Osama Aboul-Magd, Kanata (CA); Jung Hoon Suh, Kanata (CA); Kwok Shum Au, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/289,265

(22) Filed: Feb. 28, 2019

(65) Prior Publication Data

US 2020/0281008 A1    Sep. 3, 2020

(51) Int. Cl.
*H04W 72/12* (2009.01)
*H04L 5/18* (2006.01)

(52) U.S. Cl.
CPC .......... *H04W 72/1242* (2013.01); *H04L 5/18* (2013.01); *H04W 72/1268* (2013.01); *H04W 72/1289* (2013.01)

(58) Field of Classification Search
CPC ......... H04W 72/1242; H04W 72/1268; H04W 72/1289; H04L 5/18
See application file for complete search history.

(56) References Cited

U.S. PATENT DOCUMENTS

| | | | |
|---|---|---|---|
| 2003/0214930 A1* | 11/2003 | Fischer | H04L 1/1614 370/338 |
| 2008/0279138 A1 | 11/2008 | Gonikberg et al. | |
| 2010/0161851 A1* | 6/2010 | Grishaw | G06F 13/128 710/30 |
| 2014/0086227 A1 | 3/2014 | Yang et al. | |
| 2016/0212625 A1 | 7/2016 | Damnjanovic et al. | |
| 2018/0310211 A1* | 10/2018 | Su | H04W 36/0077 |
| 2019/0306801 A1* | 10/2019 | Zhou | H04W 52/44 |
| 2020/0008216 A1* | 1/2020 | Iyer | H04W 72/1242 |

FOREIGN PATENT DOCUMENTS

| | | |
|---|---|---|
| CN | 102843785 A | 12/2012 |
| CN | 106788910 A | 5/2017 |
| CN | 106922035 A | 7/2017 |
| CN | 107889131 A | 4/2018 |
| CN | 109587052 A | 4/2019 |
| WO | 2016179105 A1 | 11/2016 |
| WO | 2018160219 A1 | 9/2018 |
| WO | 2018175420 A1 | 9/2018 |

OTHER PUBLICATIONS

Machine Translation of CN 106922035(A) (Year: 2017).*

(Continued)

*Primary Examiner* — Kevin M Cunningham (74) *Attorney, Agent, or Firm* — Trop Pruner & Hu, P.C.

(57) ABSTRACT

In some examples, an access point (AP) includes a wireless interface, and at least one processor configured to send, to the first wireless device through the wireless interface, a preemption indication to cause the first wireless device to pause data transmission over a wireless channel, and send, to the first wireless device, a resume indication to cause the first wireless device to resume the data transmission over the wireless channel.

9 Claims, 4 Drawing Sheets

(56) References Cited

OTHER PUBLICATIONS

IEEE 802.11-17-1734-00-owng, Wi-Fi Time Sensitive Networking, Nov. 2017 (10 pages).
Elbamby et al., Towards Low-Latency and Ultra-Reliable Virtual Reality, Jan. 23, 2018 (8 pages).
Fischer, Michael, A Hybrid Coordination Function for QoS, Dec. 2000 (14 pages).
Ahn et al., Applied Sciences, Virtual Reality-Wireless Local Area Network: Wireless Connection-Oriented Virtual Reality Architecture for Next-Generation Virtual Reality Devices, 2018 (16 pages).
Smith et al., 802.11 QoS Tutorial, Nov. 2008 (24 pages).
Data Network Resource, 802.11e—Wi-Fi Multimedia (WMM) downloaded Nov. 8, 2018 (3 pages).
Siwamogsatham, Siwaruk, A Hybrid Coordination Function Scheme for WLANs, International Journal of Hybrid Information Technology, vol. 1, No. 3, Jul. 2008 (14 pages).
IEEE 802.1: 802.1Qbu—Frame Preemption last modified Oct. 7, 2015 (5 pages).
Wikipedia, IEEE 802.11ah last edited on Oct. 18, 2018 (5 pages).
Wikipedia, IEEE 802.11e-2005 last edited on Oct. 21, 2018 (4 pages).
CWNP, Power Save Multi-Poll (PSMP), Sep. 14, 2007 (7 pages).
Farkas et al., IEEE 802.1 Time-Sensitive Networking (TSN), IETF 99—Tutorial, Jul. 16, 2017 (55 pages).
Cisco, White Paper, Time-Sensitive Networking: A Technical Introduction, 2017 (8 pages).
Wifi Workshop, TXOP—An Explanation of Transmit Opportunity, Jul. 18, 2017 (5 pages).
IEEE Standards Association, IEEE Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications, IEEE Std 802.11 2016, 3534 pages.
IEEE P802.11ax™/D3.2, Draft Standard for Information technology—Telecommunications and information exchange between systems Local and metropolitan area networks—Specific requirements, Part 11: Wireless LAN Medium Access Control, (MAC) and Physical Layer (PHY) Specifications, Amendment 1: Enhancements for High Efficiency WLAN, Oct. 2018 (698 pages).
PRC (ISN/CN), International Search Report and Written Opinion for PCT/CN2020/075538 dated May 20, 2020 (11 pages).

* cited by examiner

DATA TRANSMISSION PREEMPTION

BACKGROUND

A wireless device can wirelessly communicate with an access point (AP) that is in a wireless network. Data communication can include an uplink communication, in which data is sent from the wireless device to the AP. Data communication can also include a downlink communication, in which data is sent from the AP to the wireless device.

Certain types of communications have low-latency requirements. For example, communications can be associated with real-time applications, such as online gaming applications or virtual reality or augmented reality applications. A real-time application may exhibit poor performance in the presence of substantial data communication delays. In real-time applications, uplink data from a wireless device can include control information (including information to control a session) or sensing data (including information acquired by sensors). Downlink data can include data (e.g., image or video frames) that results from processing responsive to the control information and/or sensing data. Downlink data can be broadcast or multicast to multiple recipient wireless devices. Generally, within a session among multiple wireless devices, the amount of downlink data transmitted can be much greater than the amount of uplink data transmitted.

It is desired that the data frames of the uplink data be transmitted by a wireless device for a real-time application as soon as the uplink data is generated at the wireless device. A significant delay in transmission of the uplink data frames can lead to delays in processing based on the uplink data frames, which can lead to a sub-optimal real-time experience. For example, a user input made at a first wireless device may not be recognized in a timely manner in the online gaming session.

SUMMARY

According to aspects of the present disclosure, an access point (AP) is able to cause preemption of data transmission by a first wireless device over a wireless channel, to allow one or more other wireless devices to communicate over the wireless channel. Preempting the data transmission of the first wireless device can allow the one or more other wireless devices an opportunity to transmit low-latency data, which may have a higher priority than the data of the first wireless device that is preempted.

According to an aspect of the present disclosure, there is provided an access point (AP) comprising a wireless interface; and at least one processor configured to send, to the first wireless device through the wireless interface, a preemption indication to cause the first wireless device to pause data transmission over a wireless channel, and send, to the first wireless device, a resume indication to cause the first wireless device to resume a transmission over the wireless channel.

According to another aspect of the present disclosure, there is provided a method performed by an AP, the method comprising sending, to a wireless device, a preemption indication to cause the wireless device to pause data transmission over a wireless channel, and sending, to the wireless device, a resume indication to cause the wireless device to resume a transmission over the wireless channel.

According to a further aspect of the present disclosure, there is provided a wireless device comprising a wireless interface, and at least one processor configured to cause transmission, through the wireless interface, of data over a wireless channel with an AP, receive, from the AP, a preemption indication, in response to the preemption indication, pause data transmission over the wireless channel, receive, from the AP, a resume indication, and in response to the resume indication, cause resumption of the data transmission over the wireless channel.

According to yet a further aspect of the present disclosure, there is provided a method performed by a first wireless device, the method comprising transmitting data over a wireless channel to an access point (AP), receiving, from the AP, a preemption indication, in response to the preemption indication, pausing data transmission over the wireless channel, receiving, from the AP, a resume indication, and in response to the resume indication, resuming the data transmission over the wireless channel.

Optionally, in any of the preceding aspects, in another implementation, the at least one processor of the AP is configured to send the preemption indication in response to determining that a second wireless device has data to send that has a higher priority than data sent by the first wireless device in the data transmission.

Optionally, in any of the preceding aspects, in another implementation, the at least one processor of the AP is configured to send the preemption indication in response to receiving information that the second wireless device has data to send with a latency constraint.

Optionally, in any of the preceding aspects, in another implementation, the at least one processor of the AP is configured to send the preemption indication on a periodic basis.

Optionally, in any of the preceding aspects, in another implementation, the pausing of the data transmission in response to the preemption indication preempts transmission of a remaining part of a data frame after a first part of the data frame has been transmitted in the data transmission, and the resume indication is to cause the first wireless device to continue sending the remaining part of the data frame that was preempted.

Optionally, in any of the preceding aspects, in another implementation, the at least one processor of the AP is configured to determine that a transmission of the data frame is incomplete in response to receiving, from the first wireless device, preemption information indicating that transmission of the data frame by the first wireless device is incomplete.

Optionally, in any of the preceding aspects, in another implementation, the preemption information is appended to the first part of the data frame.

Optionally, in any of the preceding aspects, in another implementation, the at least one processor is configured to determine that the remaining part of the data frame was preempted in response to receiving further preemption information indicating that transmission of the remaining part of the data frame was preempted.

Optionally, in any of the preceding aspects, in another implementation, the further preemption information is prepended to the remaining part of the data frame.

Optionally, in any of the preceding aspects, in another implementation, the remaining part of the data frame comprises a Medium Access Control (MAC) header that has a same sequence number and destination MAC address as a sequence number and destination MAC address in the data frame.

Optionally, in any of the preceding aspects, in another implementation, the AP is configured to perform in-band full-duplex communication with the first wireless device, and the preemption indication is carried in a same wireless channel used by the first wireless device in sending uplink data to the AP.

Optionally, in any of the preceding aspects, in another implementation, the AP is configured to perform multi-band full-duplex communication with the first wireless device, and the preemption indication is carried in a wireless channel that is different from a wireless channel used by the first wireless device in sending uplink data.

Optionally, in any of the preceding aspects, in another implementation, the first wireless device to which the preemption indication is sent is a current transmission opportunity (TXOP) holder.

Optionally, in any of the preceding aspects, in another implementation, the at least one processor of the AP is configured to check for completion of transmission of a data frame by the first wireless device in a TXOP of the first wireless device, and send the preemption indication responsive to detecting the completion of transmission of the data frame by the first wireless device, the preemption indication causing TXOP preemption.

Optionally, in any of the preceding aspects, in another implementation, the preemption indication is to cause a second wireless device to transmit data over the wireless channel.

Optionally, in any of the preceding aspects, in another implementation, the AP is to receive a further data frame transmitted by the first wireless device in the TXOP of the first wireless device responsive to the resume indication.

Optionally, in any of the preceding aspects, in another implementation, the sending of the preemption indication and the sending of the resume indication occur within a time duration of the TXOP of the first wireless device.

Optionally, in any of the preceding aspects, in another implementation, the at least one processor is configured to, after sending the preemption indication, send, to one or more other wireless devices a trigger indication to trigger the one or more other wireless devices to send data.

Optionally, in any of the preceding aspects, in another implementation, the at least one processor of the wireless device is configured to, in response to receiving, from the AP, a trigger indication sent by the AP after the AP has preempted data transmission of another wireless device, cause sending of data over the wireless channel.

Optionally, in any of the preceding aspects, in another implementation, the at least one processor of the wireless device is configured to, in response to the trigger indication, cause sending of data over the wireless channel even though the wireless device is not a transmission opportunity (TXOP) holder for the wireless channel.

Optionally, in any of the preceding aspects, in another implementation, the pausing of the data transmission over the wireless channel causes partial transmission of a data frame wherein a part of the data frame is not transmitted, and wherein the resumption of the data transmission over the wireless channel in response to the resume indication comprises transmitting the part of the data frame.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Figure 1:
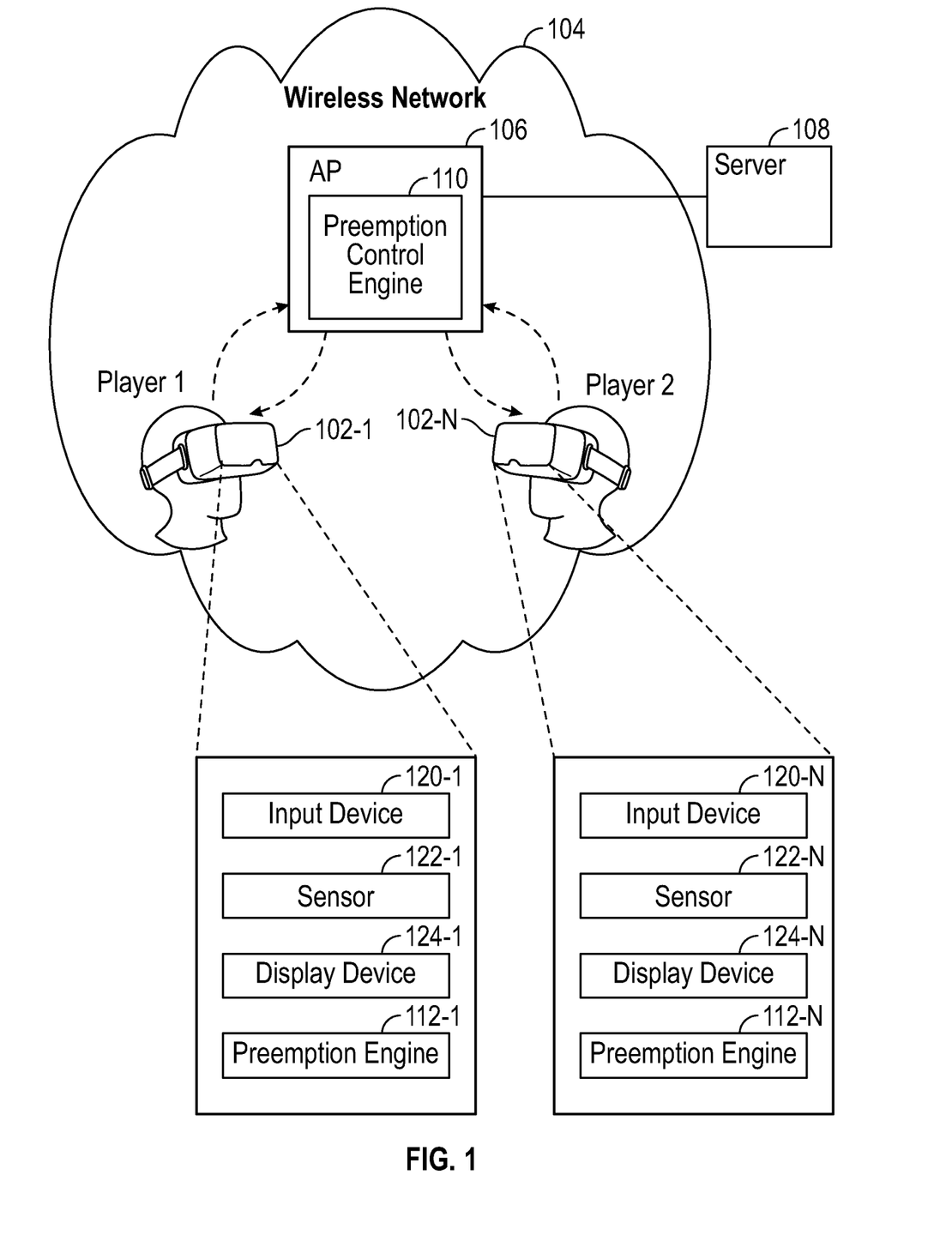
FIG. 1 is a block diagram of an example arrangement that includes various electronic devices that communicate through an access point (AP), according to some implementations of the present disclosure.

FIG. 1 is a block diagram of an example arrangement that includes electronic devices 102-1 to 102-N (N≥2) that are able to communicate over a wireless network 104 with an access point (AP) 106.

In some examples, the AP 106 and electronic devices 102-1 to 102-N are able to communicate according to the Institute of Electrical and Electronic Engineers (IEEE) 802.11 group of standards. Wireless communication technology according to IEEE 802.11 can also be referred to as Wi-Fi technology. In such examples, the wireless network 104 is referred to as a wireless local area network (WLAN).

In other examples, the AP 106 and electronic devices 102-1 to 102-N can communicate according to other standards, such as wireless standards including a Long-Term Evolution (LTE) standard as promulgated by the Third Generation Partnership Project (3GPP). In further examples, a wireless standard can include a 3GPP Fifth Generation (5G) wireless standard. In such wireless networks, an AP is referred to as a base station, such as an Evolved NodeB (eNB) for LTE.

Although just one AP 106 is shown in FIG. 1, it is noted that the wireless network 104 can include multiple APs that define respective coverage areas for communicating with electronic devices.

As used here, a "wireless device" can refer to the AP 106, an electronic device 102-1 or 102-N, or any other device that is capable of communicating wirelessly.

In the example of FIG. 1, the electronic devices 102-1 to 102-N are head-mounted devices that can be worn by respective players 1 to N. A head-mounted device is an electronic device that can be worn on the head of a user, such that a display of the head-mounted device is placed in front of the eyes of the user.

Other examples of the electronic devices 102-1 and 102-N include any or some combination of the following: a desktop computer, a notebook computer, a tablet computer, a smartphone, a wearable device (e.g., a smartwatch, smart eyeglasses, etc.), a vehicle computer, and so forth.

FIG. 1 also shows a server 108 that is connected to the AP 106. The server 108 can be implemented using one or more computers. In some examples, the server 108 is connected to the AP 106 over a wired connection. In other examples, the server 108 can be connected to the AP 106 over a wireless connection. In other examples, the electronic devices 102-1 and 102-N can interact with one another without the presence of the server 108.

In example use cases, the server 108 can establish a real-time session among the electronic devices 102-1 to 102-N. A "real-time session" refers to a communication session in which at least certain data (e.g., data responsive to user inputs or sensor measurements) is to be communicated by a device as soon as the data is generated or provided at the device, or within a specified delay time from when the data is generated or provided. The communication of the data within the specified delay time allows for content presented in the real-time session to be changed in response to the data within a time period of a specified latency requirement.

Note that the wireless network 102 may be shared by the participants of the real-time session with other electronic devices that are performing other types of communications, including Internet browsing communications, e-mail communications, and so forth, which can consume the bandwidth of the wireless network 104.

In a specific example, the server 108 can be an online gaming server or a virtual reality or augmented reality server. An online gaming server supports an online gaming session among the electronic devices 102-1 to 102-N. In the online gaming session, each electronic device 102-$i$ ($i$=1 to N) displays a video that shows a current state of the online gaming session. The online gaming session can be affected by inputs made by the users with respect to the respective electronic devices 102-1 to 102-N. Example components of each of the electronic devices 102-1 to 102-N are shown in FIG. 1.

The electronic device 102-1 includes or is connected to an input device 120-1. A user can make an input with respect to the electronic device 102-1 using the input device 120. Examples of the input device 120-1 include one or more of a joystick, a mouse, a keyboard, a touchscreen, and so forth. Additionally, the electronic device 102-1 can include or be connected to one or more sensors 122-1 that can sense various parameters, such as an orientation of the electronic device 102-1, a movement of the electronic device 102-1, and so forth. A sensor 122-1 can also include a camera to capture a still image or a video.

The electronic device 102-1 further includes or is connected to a display device 124-1 that displays content of a session (e.g., an online gaming session) established among the electronic devices 102-1 to 102-N and the server 108. The displayed content can include images or video.

Control information responsive to inputs made at the input device 120-1 and/or responsive to measurements by the one or more sensors 122-1 can be communicated by the electronic device 102-1 in an uplink of a wireless connection to the AP 106. The AP 106 can then forward the control information to the server 108. Similarly, sensing data based on measurements by the one or more sensors 122-1 can be communicated by the electronic device 102-1 in the uplink to the AP 106, which forwards the sensing data to the server 108.

The electronic device 102-N similarly includes or is connected to an input device 120-N, one or more sensors 122-N, and a display device 124-N.

The server 108 processes the control information and/or sensing data and makes changes to the content (e.g., makes changes to a video presented in the online gaming session) that is to be presented by the display devices of the electronic devices 102-1 to 102-N. The server 108 can transmit the modified content to the AP 106, which forwards the modified content in the downlink over wireless connections between the AP 106 and the electronic devices 102-1 to 102-N.

In other examples, the server 108 can include a virtual reality server that presents a simulated environment to each of the electronic devices 102-1 to 102-N. Alternatively, the server 108 can include an augmented reality server that presents an environment that includes a combination of a simulated environment and a real world environment. For example, in an augmented reality session, each user can be presented with a video that presents both a real world environment (as captured by a camera, for example) and simulated elements that overlay the real world environment.

The control information and/or sensing data sent in the uplink over the wireless connections by the electronic devices 102-1 to 102-N to the AP 106 may have a strict latency requirement. The strict latency requirement can specify that the control information and/or sensing data produced by an electronic device 102-$i$ in a real-time session such as an online gaming session or a virtual reality or augmented reality session be transmitted in less than some specified amount of delay to the server 108. In examples where the wireless network 104 is a WLAN, there may not be mechanisms to guarantee resource availability for transmitting link data such as the control information and sensing data. Even in wireless networks with some form of guarantee of resource availability in which resources are allocated for transmission of uplink data to the electronic devices 102-1 to 102-N, such resource availability guarantees may not be sufficient for the real-time session.

In accordance with some implementations of the present disclosure, the AP 106 includes a preemption control engine 110 that is able to preempt data communications in the uplink by one or more of the electronic devices 102-1 to 102-N. The preemption control engine 110 of the AP 106 interacts with preemption engines 112-1 to 112-N of respective electronic devices 102-1 to 102-N to pause and resume transmission of data by the respective electronic devices 102-1 to 102-N (discussed in further detail below).

As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

Generally, the preemption control engine 110 is able to send a preemption indication to a first electronic device to cause the first electronic device to pause data transmission over a wireless channel to allow a second wireless device to transmit over the wireless channel. As used here, a "wireless channel" can refer to a transmission resource that can be used for communicating data. For example, the wireless channel can include one or more subcarriers of different frequencies that can be allocated to an electronic device. "Pausing" a data transmission (also referred to as preempting the data transmission) of an electronic device can include interrupting the transmission of a data frame by the electronic device such that a remaining part of the data frame is not transmitted after a first part of the data frame has been transmitted. Alternatively, "pausing" a data transmission of an electronic device can include interrupting data transmission by the electronic device within a transmission opportunity (TXOP) of the electronic device. A TXOP refers to a time duration during which an electronic device is able to transmit data once the electronic device is allocated a wireless channel for communication. After expiration of the TXOP, another electronic device is able to transmit data over the wireless channel.

After the data transmission of the first electronic device has been paused by the preemption indication, the preemption control engine 110 can send to the first electronic device a resume indication to cause the first electronic device to resume the data transmission over the wireless channel. By being able to resume the data transmission that has been paused due to the preemption indication, the first electronic device can resume sending a remaining part of a data frame whose data transmission has been interrupted, or the first electronic device can continue to transmit in a TXOP of the first electronic device. The first electronic device can either send further data frame(s) or a control indication to end the TXOP if the first electronic device does not have a further data frame to transmit. More generally, "resuming" a data transmission by an electronic device can refer to either (1) the electronic device sending a remaining part of a data frame whose transmission was paused, or (2) sending further information (a further data frame or a control indication to end the TXOP) in the TXOP of the electronic device.

In accordance with some examples of the present disclosure, different techniques can be used for preempting and resuming data communications of electronic devices, based on whether full-duplex communication or half-duplex communication is used between the electronic devices 102-1 to 102-N and the AP 106. Full-duplex communication allows a given electronic device 102-*i* and the AP 106 to perform data communications over a wireless channel in both the uplink and downlink directions simultaneously.

A first type of full-duplex communication is in-band full-duplex communication. In-band full-duplex communication refers to communications of data in both the uplink and downlink directions simultaneously between an electronic device 102-*i* and the AP 106 in the same frequency band, such as over one wireless channel.

A second type of full-duplex communication is multi-band full-duplex communication. Multi-band full-duplex communication refers to data communications between an electronic device 102-*i* and the AP 106 in both directions simultaneously over multiple frequency bands (e.g., multiple wireless channels). In multi-band full-duplex communication, uplink data from the electronic device 102-*i* to the AP 106 is sent in a first wireless channel, and downlink data from the AP 106 to the electronic device 102-*i* is sent in a second wireless channel.

Figure 2:
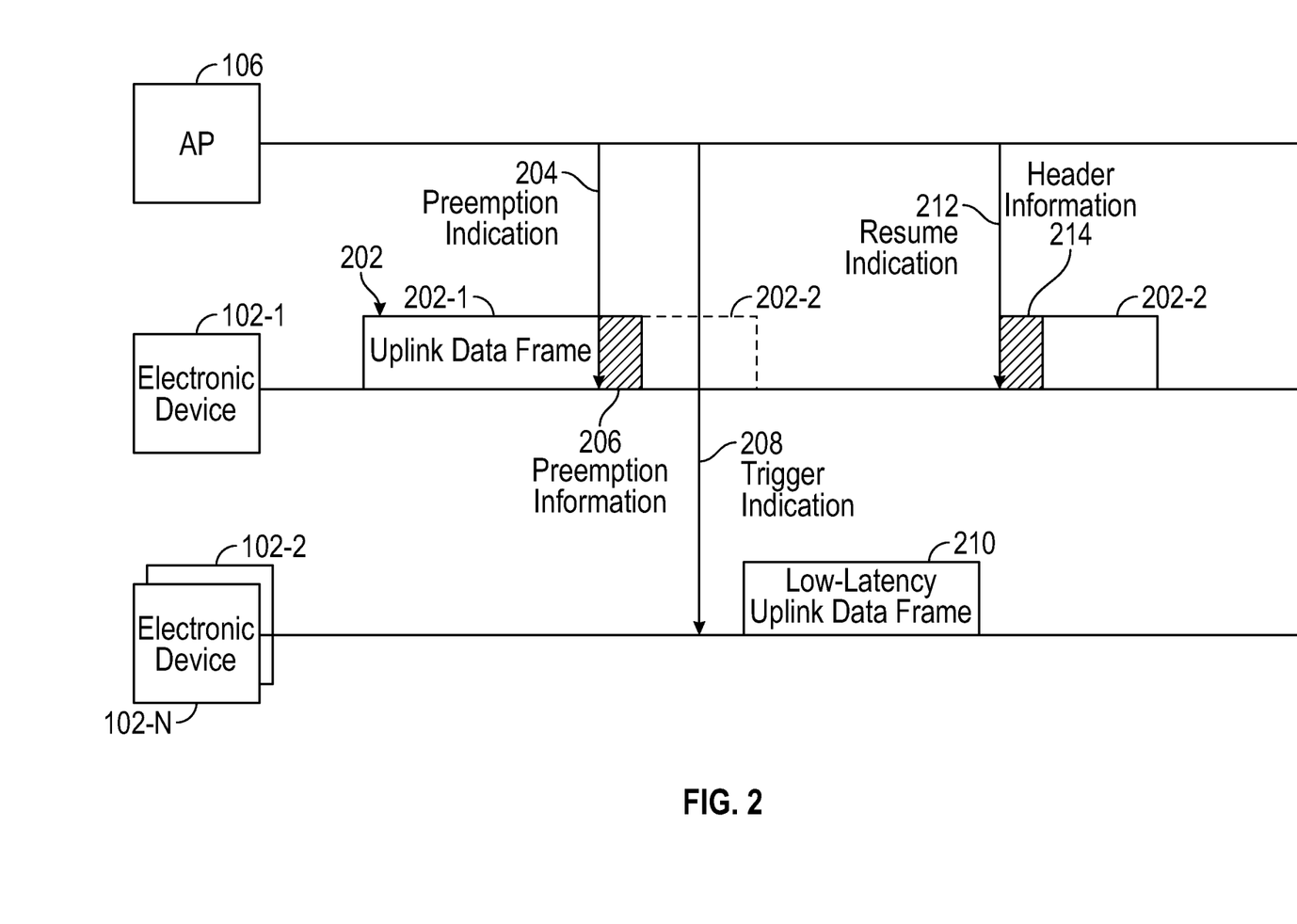
FIGS. 2 and 3 are timing diagrams illustrating examples of preempting and resuming data transmissions, according to some implementations of the present disclosure.

FIG. 2 is a timing diagram that shows how the AP 106 (and more specifically, the preemption control engine 110) is able to preempt and resume an uplink transmission of the electronic device 102-1 to allow one or more other electronic devices (including electronic devices 102-2 to 102-N) to transmit in the uplink over the given wireless channel.

In the example of FIG. 2, it is assumed that the AP 106 and the electronic devices 102-1 to 102-N perform full-duplex communications (either in-band full-duplex communication or multi-band full-duplex communication). As shown in FIG. 2, the electronic device 102-1 is transmitting a data frame 202 in the uplink to the AP 106. As used here, a "frame" can refer to a message or other data unit for carrying information.

Before completion of the transmission of the uplink data frame 202, the preemption control engine 110 of the AP 106 sends a preemption indication 204 to the electronic device 102-1. The preemption indication 204 can include a control frame. In some examples, the preemption indication can include a new control frame that is not defined by current standards, such as the IEEE 802.11 standards. For example, the control frame can include a Medium Access Control (MAC) control frame sent by a MAC layer of the AP 106. In such examples, the preemption control engine 110 and the preemption engines 112-1 to 112-N are part of the MAC layer of the respective wireless devices. In other examples, the preemption control engine 110 and the preemption engines 112-1 to 112-N can be part of other layers.

In some examples, the preemption control engine 110 can transmit the preemption indication 204 in response to determining that one or more other electronic devices 102-2 to 102-N have low-latency uplink data to transmit. "Low-latency" uplink data can refer to uplink data that has a higher priority than uplink data that is being transmitted or is to be transmitted by the electronic device 102-1. Alternatively, "low-latency" uplink data can refer to uplink data that is to be transmitted as soon as possible, or within a specified time duration from when the uplink data was generated or provided.

In some examples, the preemption control engine 110 is aware of pending low-latency uplink data frames that are waiting to be transmitted by the one or more other electronic devices 102-2 to 102-N. For example, an electronic device may send an indication to the AP 106 whenever the electronic device has low-latency uplink data (data with a latency constraint) to send.

Alternatively, the preemption control engine 110 can transmit the preemption indication 204 in response to a specified event, such as expiration of a time period or another event (e.g., request by an electronic device, etc.). In examples where the preemption control engine 110 transmits the preemption indication 204 in response to expiration of a time period, the preemption indication 204 is sent on a periodic basis.

In examples in which the electronic device 102-1 and the AP 106 support in-band full-duplex communication, the preemption indication 204 can be sent in the same wireless channel (in the downlink direction) used by the electronic device 102-1 in sending the uplink data frame 202 to the AP 106. Alternatively, in examples in which the electronic device 102-1 and the AP 106 support multi-band full-duplex communication, the preemption indication 204 is sent in a wireless channel that is different from the wireless channel used by the electronic device 102-1 to send the uplink data frame 202.

In response to the preemption indication 204, the preemption engine 112-1 in the electronic device 102-1 causes a pause of transmission of the uplink data frame 202, such that only a first part 202-1 of the uplink data frame 202 is transmitted. The pausing of the transmission of the uplink data frame 202 in response to the preemption indication 204 results in a remaining part 202-2 of the uplink data frame 202 not being transmitted until a later time (after data transmission is resumed).

In some examples, preemption information 206 can be appended to the end of the first part 202-1 of the uplink data frame 202. The preemption information 206 is transmitted by the electronic device 102-1 to the AP 106, to provide an indication to a recipient device that uplink transmission of the frame 202 has not been completed. The preemption information 206 can be generated by the transmission engine 112-1 of the electronic device 102-1. In some examples, the preemption information 206 can include a specified sequence of bits or other specified information that can be recognized by the preemption control engine 110 of the AP 106 that an uplink data frame has been partially transmitted due to preemption (i.e., transmission of the uplink data frame is not complete). In some examples, the preemption information 206 can be included in a physical (PHY) header that is part of a preamble associated with a data unit transmitted by a PHY layer of the electronic device 102-1. In other examples, the preemption information 206 can be included in a header of a higher layer such as the MAC layer that is above the PHY layer of the electronic device 102-1.

In some examples, the preemption information 206 can be in the form of a Packet Extension (PE) according to IEEE 802.11ax. The PE is a header added to the end of a data frame.

After the transmission of the preemption indication 204, the preemption control engine 110 transmits a trigger indication 208 to one or more other electronic devices 102-2 to 102-N to cause the one or more other electronic devices 102-2 to 102-N to transmit uplink data (including low-latency uplink data) to the AP 106. The trigger indication can be in the form of a control frame, such as a new control frame not yet defined by existing standards. For example, the trigger indication 208 can be in the form of a new MAC control frame. The trigger indication 208 can be broadcast to multiple electronic devices, such as by use of a broadcast address.

The preemption control engine 110 of the AP 106 can transmit the trigger indication 208 a specified time duration after the transmission of the preemption indication 204, or in response to receipt of the preemption information 206 from the electronic device 102-1.

In response to the trigger indication 208, the preemption engine(s) in the one or more other electronic devices 102-2 to 102-N that received the trigger indication 208 can cause transmission, to the AP 106, of respective one or more low-latency uplink data frames 210.

The low-latency uplink data frames 210 can be transmitted using pre-allocated resource units, such as resource units defined by IEEE 802.11ax, or other transmission resources according to other standards.

In some examples, the preemption control engine 110 is aware of the quantity of low-latency uplink data frames that are to be transmitted by the one or more other electronic devices 102-2 to 102-N. In such examples, the preemption control engine 110 can wait for completion of the transmission of such low-latency uplink data frames. In response to detecting completion of the transmission of the quantity of low-latency uplink data frames 210 by the one or more other electronic devices 102-2 to 102-N, the preemption control engine 110 sends a resume indication 212 to the electronic device 102-1.

In other examples, the preemption control engine 110 can set a time interval during which the one or more other electronic devices 102-2 to 102-N are to transmit the low-latency uplink data frames 210. In response to expiration of this time interval, the preemption control engine 110 sends the resume indication 212 to the electronic device 102-1. Note that the one or more other electronic devices 102-2 to 102-N can be configured to transmit the low-latency uplink data frames 210 during the set time interval.

The resume indication 212 can be a control frame. For example, the resume indication 212 can include a new control frame (such as a MAC control frame) that is not defined by current standards, such as the IEEE 802.11 standards.

In response to the resume indication 212, the preemption engine 112-1 of the electronic device 102-1 transmits the remaining part 202-2 of the uplink data frame 202, prepended with preemption information 214 that provides an indication to the AP 106 that the remaining part 202-2 of the uplink data frame 202 is part of a preempted uplink data frame that was previously sent by the electronic device 102-1. The preemption information 214 can be the same as the preemption information 206 appended to the first part 202-1 of the uplink data frame 202 that was previously sent by the electronic device 102-1. In some examples, the preemption information 214 can be part of a PHY header, such as a preamble, or alternatively, can be part of a MAC header.

The electronic device 102-1 can also include a MAC header in the remaining part 202-2 of the uplink data frame 202. The MAC header of the remaining part 202-2 of the uplink data frame 202 can include the same sequence number and destination MAC address included in the MAC header of the uplink data frame 202.

FIG. 2 shows an example where a data transmission of the electronic device 102-1 is preempted, under the assumption that the electronic device 102-1 is performing tasks that are latency tolerant. At a different time, the electronic device 102-1 may perform different tasks (such as due to execution of a particular application) that are low-latency tasks. In such a scenario, the data transmission of another electronic device may be preempted to allow the electronic device 102-1 to transmit low-latency data.

Figure 3:
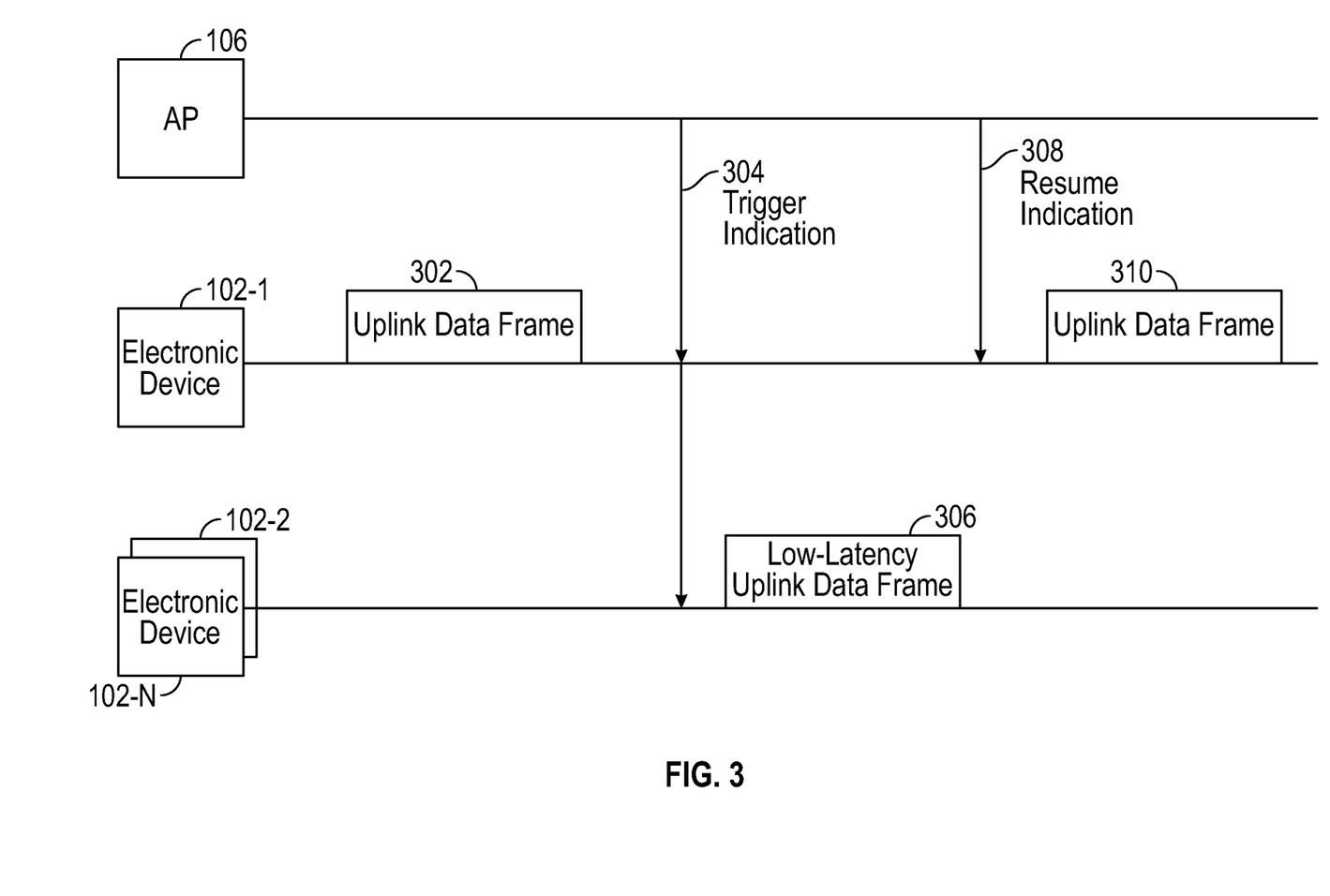

FIG. 3 illustrates a timing diagram of a different example in which the electronic devices 102-1 to 102-N and the AP 106 employ half-duplex communications. In the example of FIG. 3, the preemption of an uplink transmission is referred to as TXOP preemption. It is assumed that the electronic device 102-1 is a current TXOP holder, which means that the electronic device 102-1 has won contention-based access of a wireless channel and thus is able to transmit uplink data in a time duration corresponding to the TXOP. The other electronic devices 102-2 to 102-N are not able to transmit data in the wireless channel because the other electronic devices are not current TXOP holders for the wireless channel.

The electronic device 102-1 transmits an uplink data frame 302 to the AP 106. The preemption control engine 110 of the AP 106 can decide to preempt the TXOP of the electronic device 102-1 in response to determining either that one or more other electronic devices 102-2 to 102-N have low latency uplink data frames to transmit, or in response to a specified event. To preempt uplink transmissions of the electronic device 102-1 in the TXOP held by the electronic device 102-1, the preemption control engine 110 of the AP 106 checks for the completion of the transmission of the uplink data frame 302, and in response to detecting completion of the transmission of the uplink data frame 302, the preemption control engine 110 issues a trigger indication 304.

Unlike in FIG. 2, the preemption control engine 110 of the AP 106 does not interrupt the transmission of an individual data frame. In response to detecting the completion of transmission of the uplink data frame 302, the preemption control engine 110 broadcasts the trigger indication 304 (e.g., targeted to a broadcast address) to all electronic devices (including 102-1, 102-2, . . . , 102-N) in the coverage area of the AP 106.

The preemption engine 112-1 of the electronic device 102-1 responds to the trigger indication 304 by performing TXOP preemption at the electronic device 102-1. Effectively, at the electronic device 102-1, the trigger indication 304 is a preemption indication. The TXOP preemption causes the electronic device 102-1 to interrupt the transmission of any further data frames in the TXOP held by the electronic device 102-1.

In response to the trigger indication 304, the preemption engine(s) of the one or more other electronic devices 102-2 to 102-N can cause the one or more other electronic devices 102-2 to 102-N to transmit one or more low-latency uplink data frames 306 to the AP 106, even though the one or more other electronic devices 102-2 to 102-N are not current TXOP holders.

Subsequently, after the one or more other electronic devices 102-2 to 102-N have completed transmission of the low latency uplink data frame(s), the preemption control engine 110 of the AP 106 transmits a resume indication 308 to the electronic device 102-1. The preemption engine 112-1 in the electronic device 102-1 responds to the resume indication 308 by continuing to transmit one or more uplink data frames 310 in the TXOP that is held by the electronic device 102-1. Alternatively, if the electronic device 102-1 has no further data frames to transmit in the TXOP, the electronic device 102-1 can send a control indication to end the TXOP. The control indication can include an End of Service Period (EOSP) indication, for example.

Figure 4:
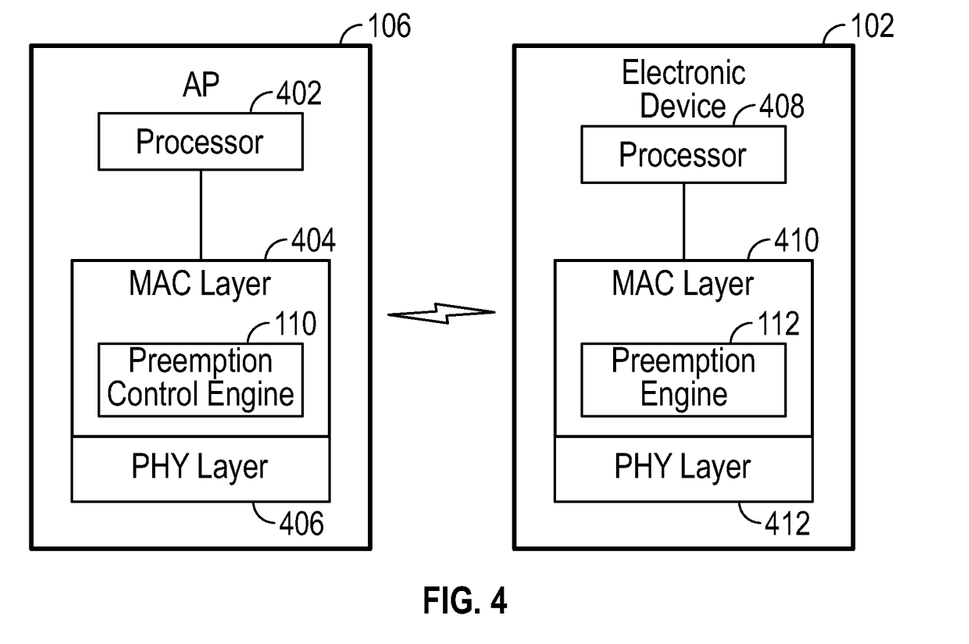
FIG. 4 is a block diagram of an AP and an electronic device according to some examples of the present disclosure.

FIG. 4 is a block diagram of components of the AP 106 and an electronic device 102 according to some examples. The AP 106 includes one or more hardware processors 402. A hardware processor can include a microprocessor, a core of a multi-core microprocessor, a microcontroller, a programmable integrated circuit, a programmable gate array, a digital signal processor, or another hardware processing circuit.

The AP 106 further includes a MAC layer 404. In some examples, the MAC layer 404 includes the preemption control engine 110, which can be implemented as machine-readable instructions executable on the one or more hardware processors 402. The AP 106 further includes a PHY layer 406, which can include a wireless transceiver for transmitting and receiving wireless signals.

The electronic device 102 includes one or more hardware processors 408. The electronic device 102 includes a MAC layer 410 and a PHY layer 412. In some examples, the MAC layer 410 can include a preemption engine 112 (which is similar to preemption engine 112-1 or 112-N) discussed above).

Machine-readable instructions can be stored in a non-transitory machine-readable or computer-readable storage medium, which can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An access point (AP) comprising:
a wireless interface; and
at least one processor configured to:
  send, to a first wireless device through the wireless interface, a preemption indication to cause the first wireless device to pause data transmission over a wireless channel, wherein the pausing of the data transmission in response to the preemption indication preempts transmission of a remaining part of a data frame after a first part of the data frame has been transmitted in the data transmission;
  determine that a transmission of the data frame is incomplete and that the remaining part of the data frame was preempted in response to receiving, from the first wireless device, preemption information indicating that transmission of the data frame by the first wireless device is incomplete;
  after sending the preemption indication and in response to receipt of the preemption information, send, to one or more other wireless devices, a trigger indication to trigger the one or more other wireless devices to send data in a pre-allocated resource, and
  send, to the first wireless device, a resume indication to cause the first wireless device to resume a transmission over the wireless channel, wherein the resume indication is to cause the first wireless device to continue sending the remaining part of the data frame that was preempted, and wherein the remaining part of the data frame comprises a Medium Access Control (MAC) header that has a same sequence number and destination MAC address as a sequence number and destination MAC address in the data frame.

2. The AP of claim 1, wherein the at least one processor is configured to send the preemption indication in response to determining that a second wireless device has data to send that has a higher priority than data sent by the first wireless device in the data transmission.

3. The AP of claim 2, wherein the at least one processor is configured to send the preemption indication in response to receiving information that the second wireless device has data to send with a latency constraint.

4. The AP of claim 1, wherein the at least one processor is configured to send the preemption indication on a periodic basis.

5. The AP of claim 1, wherein the preemption information is appended to the first part of the data frame.

6. The AP of claim 1, wherein the AP is configured to perform in-band full-duplex communication with the first wireless device, and
wherein the preemption indication is carried in a same wireless channel used by the first wireless device in sending uplink data to the AP.

7. The AP of claim 1, wherein the AP is configured to perform multi-band full-duplex communication with the first wireless device, and wherein the preemption indication is carried in a wireless channel that is different from a wireless channel used by the first wireless device in sending uplink data.

8. The AP of claim 1, wherein the first wireless device to which the preemption indication is sent is a current transmission opportunity (TXOP) holder.

9. A method performed by an access point (AP), the method comprising:

sending, to a wireless device, a preemption indication to cause the wireless device to pause data transmission over a wireless channel, wherein the pausing of the data transmission in response to the preemption indication preempts transmission of a remaining part of a data frame after a first part of the data frame has been transmitted in the data transmission;

determining that a transmission of the data frame is incomplete and that the remaining part of the data frame was preempted in response to receiving, from the wireless device, preemption information indicating that transmission of the data frame by the wireless device is incomplete;

after sending the preemption indication and in response to receipt of the preemption information, sending, to one or more other wireless devices, a trigger indication to trigger the one or more other wireless devices to send data in a pre-allocated resource; and sending, to the wireless device, a resume indication to cause the wireless device to resume a transmission over the wireless channel, wherein the resume indication is to cause the wireless device to continue sending the remaining part of the data frame that was preempted, and wherein the remaining part of the data frame comprises a Medium Access Control (MAC) header that has a same sequence number and destination MAC address as a sequence number and destination MAC address in the data frame.

* * * * *